(12) United States Patent
Harris, II

(10) Patent No.: US 9,844,208 B2
(45) Date of Patent: *Dec. 19, 2017

(54) EMERGENCY LEASH

(71) Applicant: John Robert Harris, II, Rancho Palos Verdes, CA (US)

(72) Inventor: John Robert Harris, II, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/442,440

(22) Filed: Feb. 24, 2017

(65) Prior Publication Data

US 2017/0164583 A1    Jun. 15, 2017

Related U.S. Application Data

(63) Continuation of application No. 14/066,331, filed on Oct. 29, 2013, now Pat. No. 9,609,851.

(60) Provisional application No. 61/720,837, filed on Oct. 31, 2012.

(51) Int. Cl.
*A01K 27/00*    (2006.01)

(52) U.S. Cl.
CPC .......... *A01K 27/004* (2013.01); *A01K 27/006* (2013.01); *A01K 27/009* (2013.01)

(58) Field of Classification Search
CPC .... A01K 27/00; A01K 27/001; A01K 27/002; A01K 27/003; A01K 27/004
USPC ......... 242/388.3, 388.6, 396.1, 396.2, 396.5, 242/396.6, 396.7, 405.1, 407
See application file for complete search history.

(56) References Cited

U.S. PATENT DOCUMENTS

| | | | |
|---|---|---|---|
| 2,250,171 A * | 7/1941 | Wilkins | A01K 27/004 242/377 |
| 2,589,192 A | 3/1952 | Johnston | |
| 3,233,591 A * | 2/1966 | Rogers | A01K 27/004 119/796 |
| 3,250,253 A | 5/1966 | Galin | |
| 3,315,642 A * | 4/1967 | Rogers | A01K 27/004 119/796 |
| 4,018,189 A | 4/1977 | Umphries et al. | |

(Continued)

FOREIGN PATENT DOCUMENTS

| | | |
|---|---|---|
| CN | 201467805 U | 5/2010 |
| GB | 2461876 A | 1/2010 |

(Continued)

OTHER PUBLICATIONS

International Search Report in PCT International Application No. PCT/US2013/067562; dated Mar. 27, 2014, 4 pages.

*Primary Examiner* — Monica L Williams
*Assistant Examiner* — Aaron M Rodziwicz
(74) *Attorney, Agent, or Firm* — Fulwider Patton LLP

(57) ABSTRACT

A leash includes a container housing to be carried on a collar, chain, harness or other similar restraint, readily available for use. An outer end of a leash strap can be pulled by a user to dispense the leash strap for use, and the leash can be retracted and rewound in the container housing. The leash can be latched in a retracted configuration to prevent unwanted extension of the leash, and can be unlatched by a user for extension or storage of the leash in the retracted configuration. In one form the leash includes a thumb wheel that can be turned by a user on an inner rotatable spool in an unlatched position, and rotation of the thumb wheel is prevented in a latched position.

20 Claims, 14 Drawing Sheets

(56) References Cited

U.S. PATENT DOCUMENTS

| | | | |
|---|---|---|---|
| 4,328,767 A | 5/1982 | Peterson | |
| 4,488,511 A | 12/1984 | Grassano | |
| 6,481,382 B2 | 11/2002 | Cohn | |
| 6,581,548 B1 | 6/2003 | Reid | |
| 7,281,495 B2 | 10/2007 | Wagner | |
| 7,290,731 B1* | 11/2007 | Tabor | A63H 27/002 |
| | | | 242/291 |
| D621,562 S | 8/2010 | Marshall | |
| 8,001,933 B2 | 8/2011 | Robley et al. | |
| D648,905 S | 11/2011 | Maurer | |
| D662,267 S | 6/2012 | Morin | |
| 2008/0017323 A1 | 1/2008 | Peterson | |
| 2008/0052944 A1 | 3/2008 | Lee | |
| 2008/0250615 A1* | 10/2008 | Emenheiser | F16B 45/02 |
| | | | 24/599.5 |
| 2009/0211860 A1 | 8/2009 | Glenn | |
| 2011/0315090 A1* | 12/2011 | Marshall | A01K 27/005 |
| | | | 119/796 |
| 2013/0081580 A1 | 4/2013 | Bogdahn et al. | |

FOREIGN PATENT DOCUMENTS

| | | |
|---|---|---|
| WO | 2008063916 A2 | 5/2008 |
| WO | 2011107833 A1 | 9/2011 |

\* cited by examiner

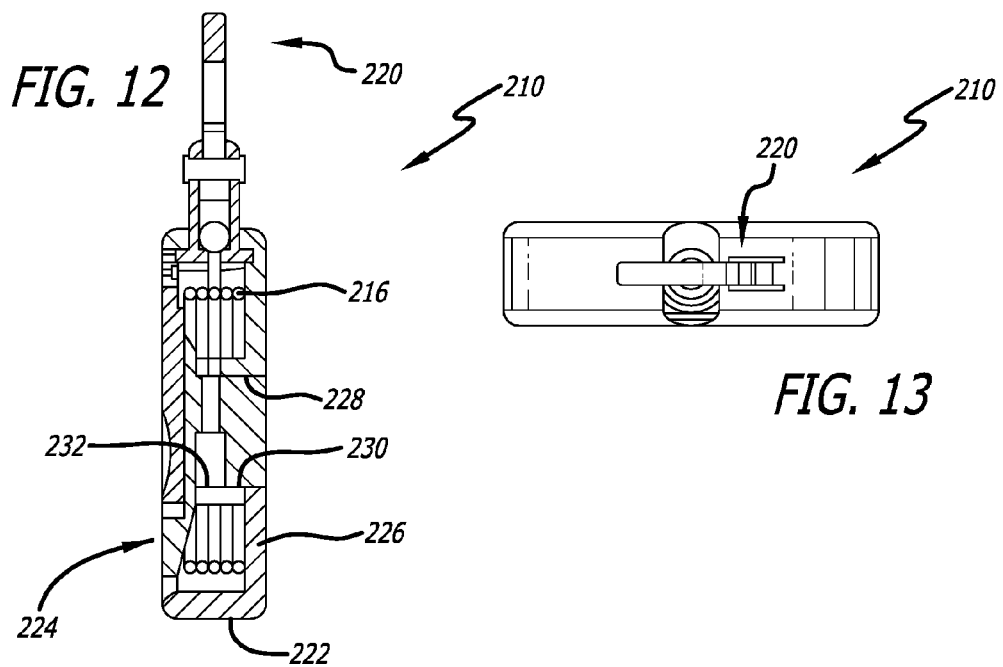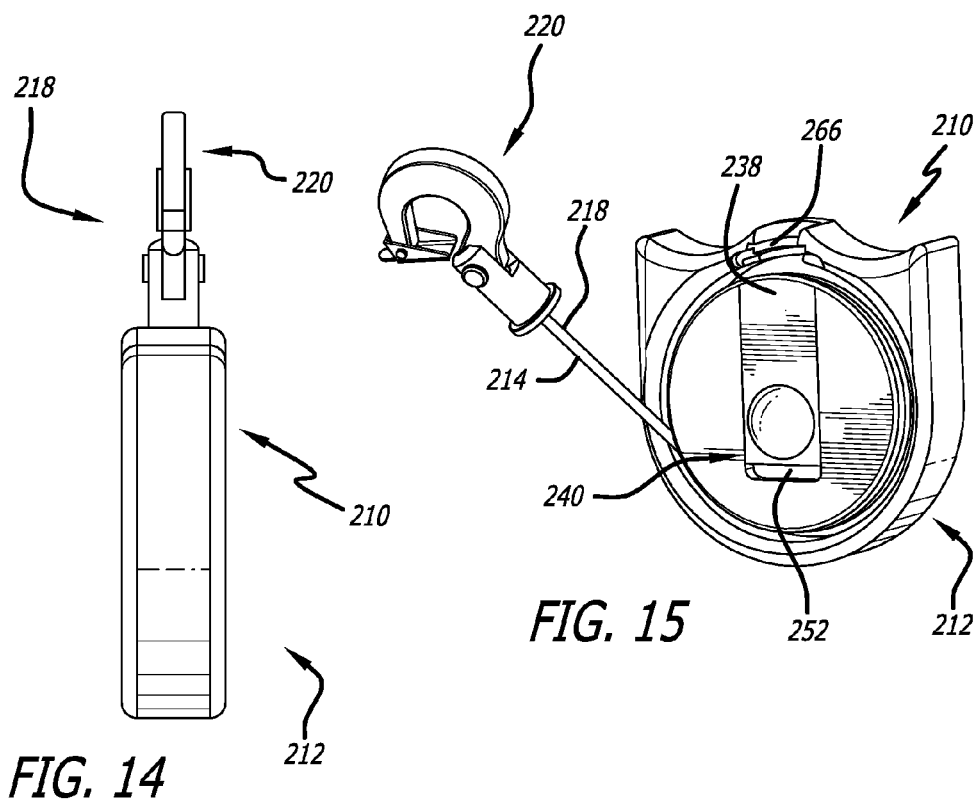

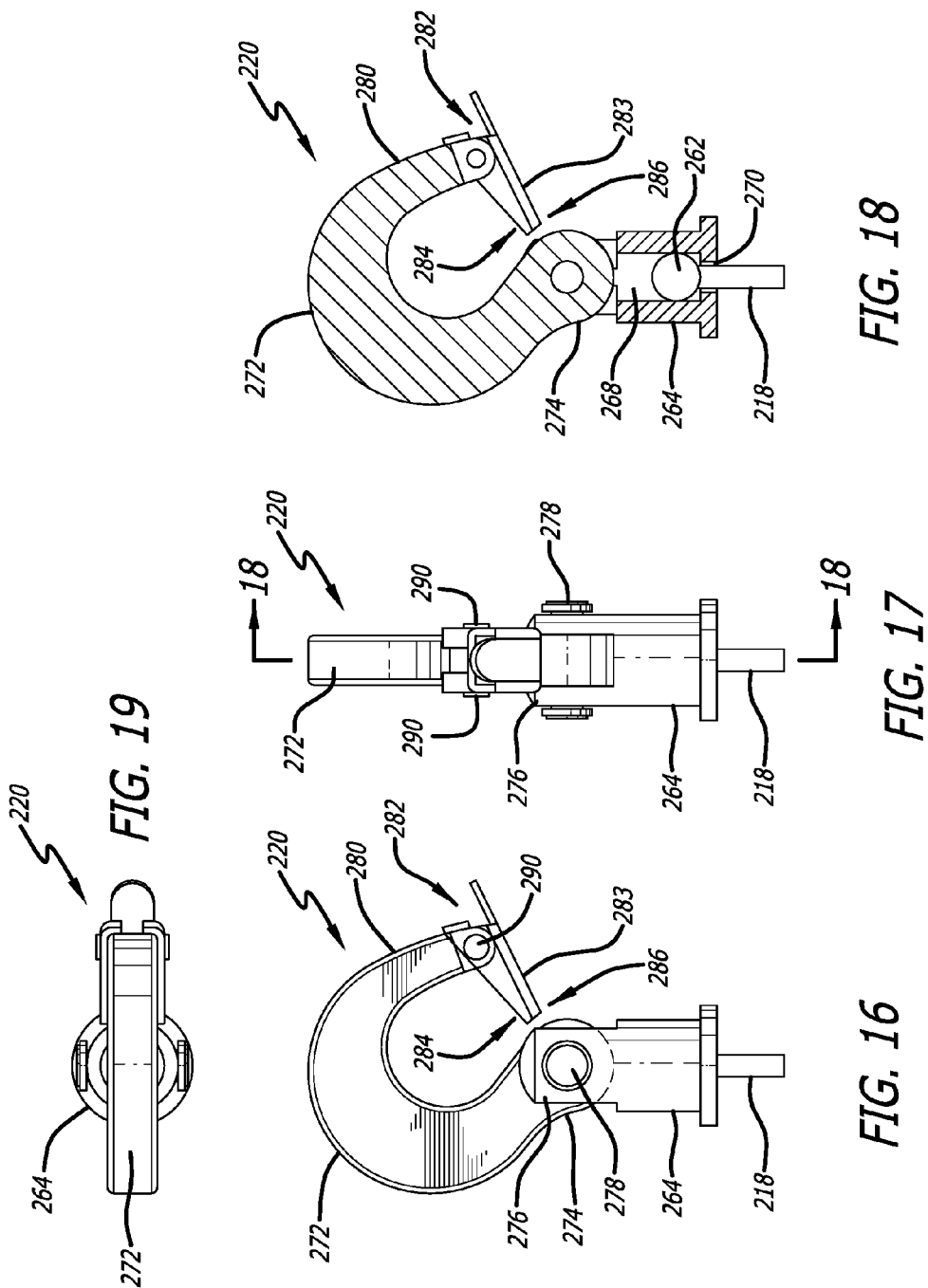

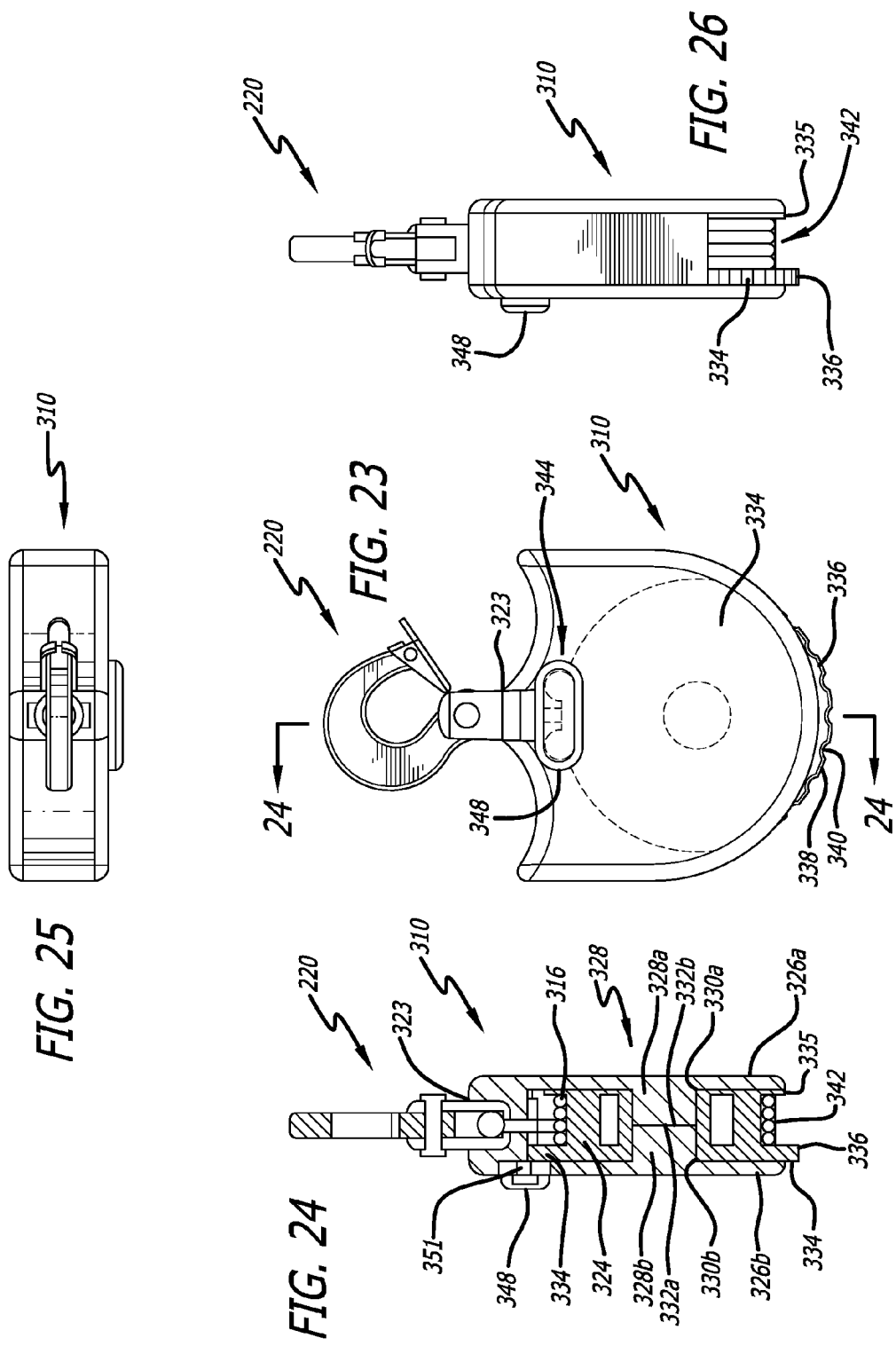

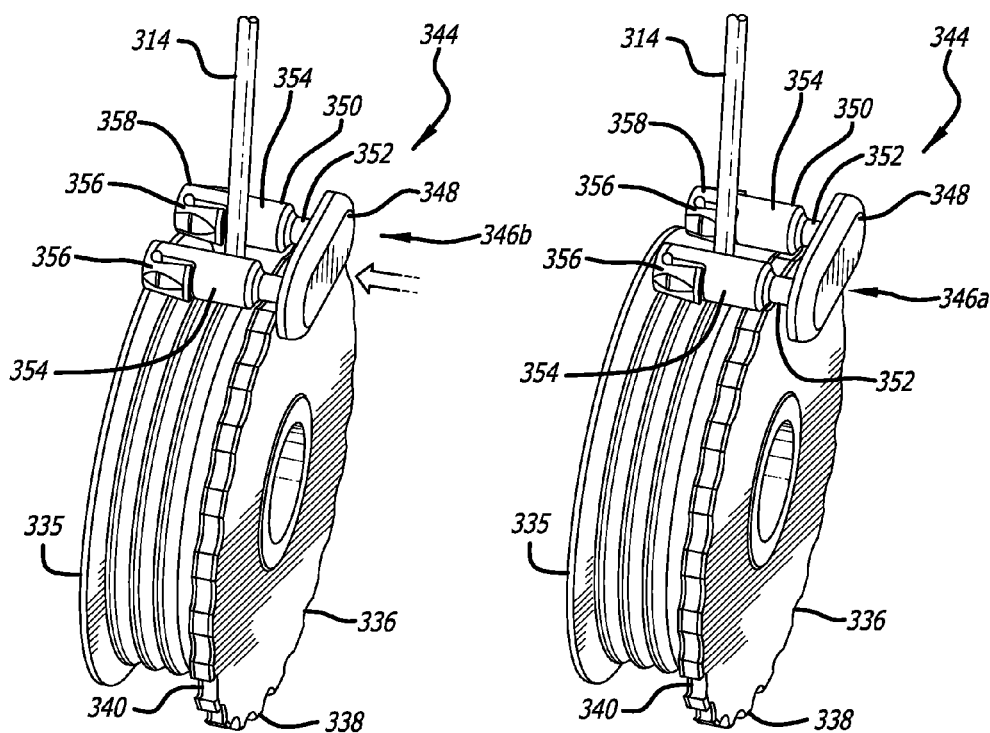
FIG. 27A  FIG. 27B
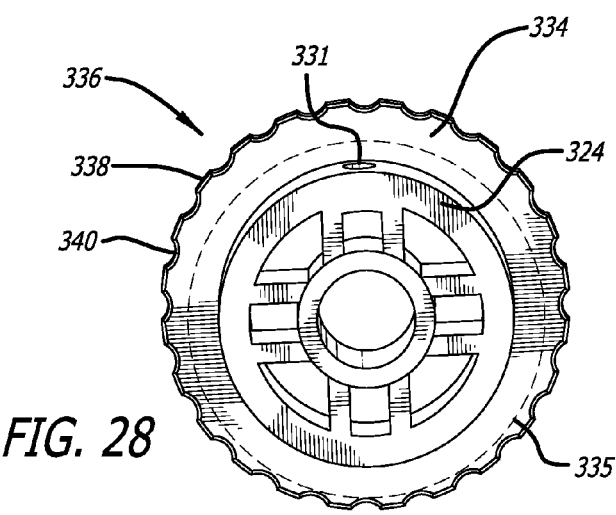
FIG. 28

EMERGENCY LEASH

CROSS-REFERENCES TO RELATED APPLICATIONS

This application is a continuation of U.S. application Ser. No. 14/066,331, filed Oct. 29, 2013, which claims priority from U.S. Application No. 61/720,837, filed Oct. 31, 2012, which are incorporated by reference in their entirety.

BACKGROUND

The present invention relates generally to retractable leashes for animals such as pets, as well as for children, and more particularly relates to a leash configured to be connected to and carried on a collar, chain, harness or another suitable type of article for restraining or controlling an animal or a child, for example, and having a leash strap, cord or tether that can be dispensed and rewound.

One known conventional self-retracting leash for pets includes a casing fastened to a pet collar with a rotatable reel in the casing and a flexible leash wound onto the reel. A spring engages both the reel and the casing and tightly coils the flexible leash in response to unwinding of the leash. Another known conventional self-retracting leash for a pet collar includes a spring driven retractor mechanism that includes a guide ring providing a stop for a handle on a free end of the leash when the leash is retracted, positioning the handle on top of the animal's neck when the leash is not in use.

Another known self-retracting pet leash includes a casing with a spool mounted for rotation within the casing, and a leash coiled on the spool in a retracted position and extendable through an aperture in a wall of the casing. A spring within the casing biases the spool to retract the leash into the hollow casing, and a brake device is engageable with the spool to stop the leash at a predetermined distance from the casing.

It has been found that self-winding leash recoiling systems including a spring mechanism typically makes a leash container housing undesirably large and heavy for miniature pets to continuously carry on a collar, and it has been found that the self-winding leash recoiling systems are typically the first part of a self-winding leash container housing to break.

It would be desirable to provide a leash that can be carried on a collar, chain or harness, or suitable type of article for restraining or controlling an animal or a child, for example, having a leash strap, cord or tether that can be grasped and pulled by the user to dispense the leash strap, cord or tether for use, and that can be rewound by the user. It also would be desirable to provide an improved, lighter weight and more robust self-winding leash that can be latched in a retracted configuration to prevent unwanted extension of the leash, and unlatched by a user for extension or storage of the leash in the retracted configuration. It also would be desirable to provide an improved, lighter weight and more robust manually wound leash that can be latched in a retracted configuration to prevent unwanted extension of the leash, and unlatched by a user for extension or storage of the leash in the retracted configuration. The present invention meets these and other needs.

SUMMARY OF THE INVENTION

Briefly, and in general terms, the present invention provides for a leash configured to be connected to an article for restraining or controlling an animal or a child. The leash includes a leash container housing and a leash strap, cord or tether that can be grasped and pulled by a user to dispense the leash strap, cord or tether for use, and that can be retracted into the leash container housing. The leash can be latched in a retracted configuration to prevent undesired extension of the leash, and can be unlatched by a user, either for extension for use or storage of the leash in the retracted configuration. The leash is relatively small and light, compared to conventional self-winding leashes, is more robust than conventional self-winding leash systems, and is easily manufactured.

In a first presently preferred embodiment the present invention accordingly provides for a leash configured to be connected to and carried on an article, such as a collar, check chain, harness, or any other similar article suitable for restraining or controlling an animal, such as a pet, or a child, for example. The leash includes a leash container housing and a leash strap, cord or tether configured to be contained within and dispensed from the leash container housing. The leash container housing includes an outer circumferential case portion with an outer slot, and an inner rotatable spool portion including two opposing sidewalls and a spindle fixedly connected between the two opposing sidewalls. The leash strap, cord or tether has an inner end fixedly attached to the spindle of the inner rotatable spool portion of the leash container housing, and an outer end of the leash strap, cord or tether is threaded through the outer slot of the outer circumferential case portion. The leash strap, cord or tether can be moved by a user between a coiled configuration coiled within the container housing and an extended configuration extending from the leash container housing. The outer end of the leash strap, cord or tether is configured to be grasped and pulled by the user from the leash container housing to dispense the leash strap, cord or tether for use, and the opposing sidewalls of the spool portion are configured to be turned by the user to rewind the leash on the spindle of the spool portion of the leash container housing.

In a presently preferred aspect, the outer end of the leash strap, cord or tether may include a wrist loop. In another presently preferred aspect, the leash container housing includes an exterior swiveling attachment ring configured to be attached to a collar, chain or harness, or another suitable type of article for restraining or controlling an animal, such as a pet, or a child, for example. In another presently preferred aspect, the opposing sidewalls of the inner rotatable spool portion include first and second central cylindrical pin members extending inwardly from the opposing sidewalls, and the spindle is generally tubular, including an axially interior oriented channel configured to receive the first and second central cylindrical pin members extending inwardly from the opposing sidewalls, respectively, in interlocking relationship. In another presently preferred aspect, one of the central cylindrical pin members and the spindle includes an interlocking key, and the other of the central cylindrical pin members and the spindle includes corresponding grooves for receiving the interlocking key.

In another presently preferred aspect, the leash container housing may include a glow in the dark identification tag or reflective identification tag, for example. In another presently preferred aspect, the leash strap, cord or tether can have a cross-sectional shape that is flat, round, oval, or any other desired cross-sectional shape, and can be formed of a plastic such as nylon, composite material, fabric, metal, or other similar suitable materials, for example.

In a second preferred embodiment, the present invention provides for a leash configured to be connected to and carried on an article, such as a collar, check chain, harness, or any other similar article suitable for restraining or controlling an animal, such as a pet, or a child, for example. The leash includes a container housing having first and second side walls and an outer edge portion defining an interior chamber therebetween, and first and second openings through the container housing. A latch pin is slidably mounted in the interior chamber adjacent to the first opening, and is movable between a latched position and an unlatched position.

A latch control button is also mounted adjacent to the latch pin, and has a first portion extending through the second opening through the container housing and a second portion abutting the latch pin. The latch control button is pivotally mounted in the interior chamber, and is movable between a first latching control position and a second latching control position. The latch control button moves the latch pin to the latched position in the first latching control position, and releases the latch pin to be free to move to the unlatched position in the second latching control position. The latch control button is preferably biased to the first latching control position, and the second portion of the latch control button moves to release the latch pin to be free to move to the unlatched position when the first portion of the latch control button is pressed inwardly within the interior chamber of the container housing.

A biasing member also is disposed in the interior chamber and fixedly attached at the inner end of the biasing member to a portion of the container housing, and a leash strap, cord or tether is provided that is configured to be contained within and dispensed from the container housing. An inner end of the leash strap, cord or tether is connected to the outer end of the biasing member and an outer end of the leash strap, cord or tether extends through the first opening of the container housing. The leash strap, cord or tether has an extended configuration extending from the container housing and a retracted configuration coiled within the container housing, and the leash strap, cord or tether is preferably biased to be in the retracted configuration by the biasing member.

In a presently preferred aspect, the outer end of the leash strap, cord or tether includes a connector assembly configured to be attached to a collar, chain or harness, or another suitable type of article for restraining or controlling an animal, such as a pet, or a child, for example. The connector assembly preferably includes a cylindrical stem connected to the outer end of the leash strap, cord or tether, and the cylindrical stem preferably includes an end portion with an outer surface defining a recess or notched portion configured to receive the latch pin in the latched position when the leash strap, cord or tether is in the retracted configuration. In another presently preferred aspect, the recess or notched portion has an outer circumferential channel extending around the outer surface of the cylindrical stem defining the recess or notched portion. In another presently preferred aspect, the connector assembly includes a collar connector ring configured to be attached to the collar, chain or harness, for example.

In another presently preferred aspect, the connector assembly can be configured to be connected to a check chain including a guide ring at a first end and a leash connector ring at a second end, the check chain forming a loop extending through the guide ring, and the leash further includes a clip configured to removably connect the collar connector ring of the connector assembly to a portion of the chain, such as at or near the guide ring, for example, to support the weight of the container housing while the collar connector ring is connected to the leash connector ring of the check chain until the leash strap, cord or tether is moved from the retracted position.

In another presently preferred aspect, the leash container housing may include a glow in the dark, reflective ID tag on at least one of the sides of the container housing. In another presently preferred aspect, the leash container housing may include an LED light configured to be switched on when the leash strap, cord or tether is in the extended configuration. In another presently preferred aspect, the leash may include a GPS locating device configured to identify and transmit the location of the container housing.

In a third presently preferred embodiment, the present invention provides for a leash including a leash including a leash container housing, an inner fixed spool portion fixedly attached to the container side wall, a leash strap configured to be removably coiled on the spool portion, and a sliding latch member movable between open and closed positions to allow a user to wind the leash strap onto the spool portion when the latch member is in an open position, latch the latch member in the closed position to keep the leash coiled ready for use, and to allow the user to unwind the leash strap by moving the latch member again to the open position.

Accordingly, in the third embodiment, the leash includes a leash container housing including a stationary outer circumferential case portion, a container side wall fixedly attached to the stationary outer circumferential case portion, and an inner fixed spool portion fixedly attached to the container side wall. A fixed rewinding spindle includes a first end fixedly attached to the container side wall and extending from the container side wall substantially perpendicular to the container side wall, and a second end of the fixed rewinding spindle is fixedly attached to an outer rewinding plate that extends only partially toward the stationary outer circumferential case portion, such that the outer rewinding plate and the stationary outer circumferential case portion define a rewinding slot open around the outer rewinding plate.

The leash strap inner end is connected within the container housing and has a coiled configuration coiled within the container housing and an extended configuration extending from the container housing. In a presently preferred aspect, when the leash strap is coiled within the container housing, the exposed outer end extends a short distance from the container housing to allow a user to grasp the leash strap and pull the exposed outer end from the leash container housing. In another presently preferred aspect, the latch member is slidably movable between the open position and the closed position.

In another presently preferred aspect, the sliding latch member has ridges along opposing longitudinal side edges of the sliding latch member that are slidably movable along corresponding grooves formed in opposing longitudinal side edges of a channel formed in the outer rewinding plate.

The present invention also provides for a fourth presently preferred embodiment of a leash configured to be connected to an article for restraining or controlling an animal or a child. The leash of the fourth embodiment includes a leash container housing including a stationary outer circumferential case portion, first and second side walls fixedly attached to the stationary outer circumferential case portion and defining an interior chamber therein, at least one aperture being defined through one of the first and second side walls, and a leash strap opening defined in the stationary outer circumferential case portion.

A fixed spindle extends between the first and second container side walls substantially perpendicular to the first and second container side walls, and an inner rotatable spool portion is rotatably mounted between the first and second side walls over the fixed spindle. The inner rotatable spool portion includes a substantially circular outer thumb wheel rigidly affixed to an outer end of the inner rotatable spool portion and disposed interior to and adjacent to one of the first and second container side walls, such that the thumb wheel permits a user to turn the inner rotatable spool portion by turning the thumb wheel. In a presently preferred aspect, the inner rotatable spool portion also includes an opposing spool end plate rigidly affixed at an inner end of the inner rotatable spool portion and disposed interior to and adjacent to the other of the container side walls.

A latch member slidably mounted to the container housing is slidably movable between an outwardly extending latched position and an inwardly extending unlatched position, such that the latch member is configured to prevent rotation of the thumb wheel in the outwardly extending latched position, and is configured to allow rotation of the thumb wheel in the inwardly extending unlatched position. In a presently preferred aspect, the latch member is biased to be in the outwardly extending latched position.

A leash strap is provided that extends through the leash strap opening in the stationary outer circumferential case portion, and has a coiled configuration coiled within the container housing and an extended configuration extending from the container housing. In another presently preferred aspect, the fixed spindle includes a first spindle portion and a second spindle portion. The first spindle portion has a first spindle portion outer end that is fixedly attached to one of the first and second container side walls and extending from the one of the first and second container side walls substantially perpendicular to the first and second container side walls, and a second spindle portion has a second spindle portion outer end that is fixedly attached to the other of the first and second container side walls and extends from the other of the first and second container side walls substantially perpendicular to the first and second container side walls, and the first and second spindle portion inner ends are disposed adjacent to each other.

In another presently preferred aspect, the thumb wheel includes an outer edge having a surface defining ridges and grooves. In another presently preferred aspect, the latch member includes a button portion disposed outwardly of one of the container side walls, and first and second latch pins extending inwardly through the at least one aperture through one of the first and second side walls into the interior chamber of the container housing over the grooves of the thumb wheel. In another presently preferred aspect, each of the first and second latch pins includes a first shaft portion connected to the button portion and having a first diameter, and a second shaft portion has a second diameter that is larger than the first diameter. The second shaft portion preferably is dimensioned and configured to engage the grooves of the thumb wheel and prevent rotation of the thumb wheel when the latch member is in the outwardly extending latched position, and the first shaft portion connected to the button portion preferably is dimensioned and configured to permit rotation of the thumb wheel when the latch member is in the inwardly extending unlatched position.

In one presently preferred aspect of each of the third and fourth embodiments, a collar connector assembly can be connected to the outer, exposed end of the leash strap, and the collar connector assembly preferably includes a tubular stem configured to be received in a slot of the outer circumferential case, and the collar connector assembly configured to be removably attached to a pet collar. In another presently preferred aspect, the collar connector assembly includes a hook portion having a base connected to the outer end portion of the tubular stem and an outer end configured to be removably attached to the pet collar. In another presently preferred aspect, the base of the hook portion is connected to the outer end portion of the tubular stem by a pivot pin extending through the base of the hook portion. In another presently preferred aspect, the outer end of the hook portion includes a spring loaded latch assembly having a hook latch member pivotally connected to the outer end of the hook portion and pivotally movable between an open position and a closed position, the hook latch member leaving an entrance slot of the hook portion open in the open position, and the hook latch member substantially bridging and closing the entrance slot in the closed position. In another presently preferred aspect, the hook latch member is biased to be in the closed position substantially bridging and closing the entrance slot. In another presently preferred aspect, the outer end of the leash strap includes an enlarged portion, and the tubular stem of the collar connector assembly includes an inner chamber having an interior lip portion configured to receive and retain the enlarged end portion of the outer end of the leash strap.

These and other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 12 is a cross-sectional view of the leash taken along line 12-12 of FIG. 10.

FIG. 13 is a top plan view of the leash of FIG. 10.

FIG. 14 is a side elevational view of the leash of FIG. 10.

FIG. 15 is a front perspective view of the leash of FIG. 10, showing the leash strap, cord or tether partially uncoiled.

FIG. 16 is a front plan view of the collar assembly of the leash of FIG. 10.

FIG. 17 is a side elevational view of the collar assembly of FIG. 16.

FIG. 18 is a cross-sectional view of the collar assembly taken along line 18-18 of FIG. 17.

FIG. 19 is a top plan view of the collar assembly of FIG. 16.

FIG. 23 is a front plan view of the leash of FIG. 21.

FIG. 24 is a cross-sectional view of the leash taken along line 24-24 of FIG. 21.

FIG. 25 is a top plan view of the leash of FIG. 21.

FIG. 26 is a side elevational view of the leash of FIG. 21.

FIG. 27A is a cutaway perspective view of the leash of FIG. 21, showing the leash strap, cord or tether partially uncoiled and the spring loaded latch button in an unlatched position.

FIG. 27B is a cutaway perspective view of the leash of FIG. 21, showing the leash strap, cord or tether partially uncoiled and the spring loaded latch button in a latched position.

FIG. 28 is a perspective view of the thumb wheel of the leash of FIG. 21.

DETAILED DESCRIPTION OF THE PREFERRED EMBODIMENTS

Figure 1:
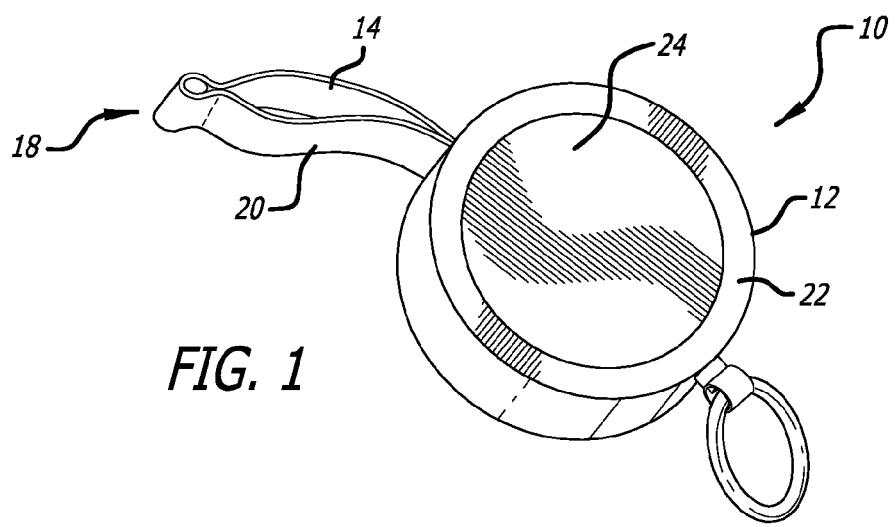
FIG. 1 is a perspective view of a first embodiment of the leash in a coiled or rewound configuration, according to the present invention.

Referring to the drawings, which are provided by way of example, and not by way of limitation, the present invention provides for a leash, in the form of a lightweight and small, typically approximately one inch diameter and approximately a quarter inch thick medallion or pendant, similar to a medallion shaped ID tag, that is configured to be attached to, and typically carried on, on a collar, check chain or choke chain, harness, or any other similar suitable type of article for restraining or controlling an animal, such as a pet, or a child, for example.

Figure 2:
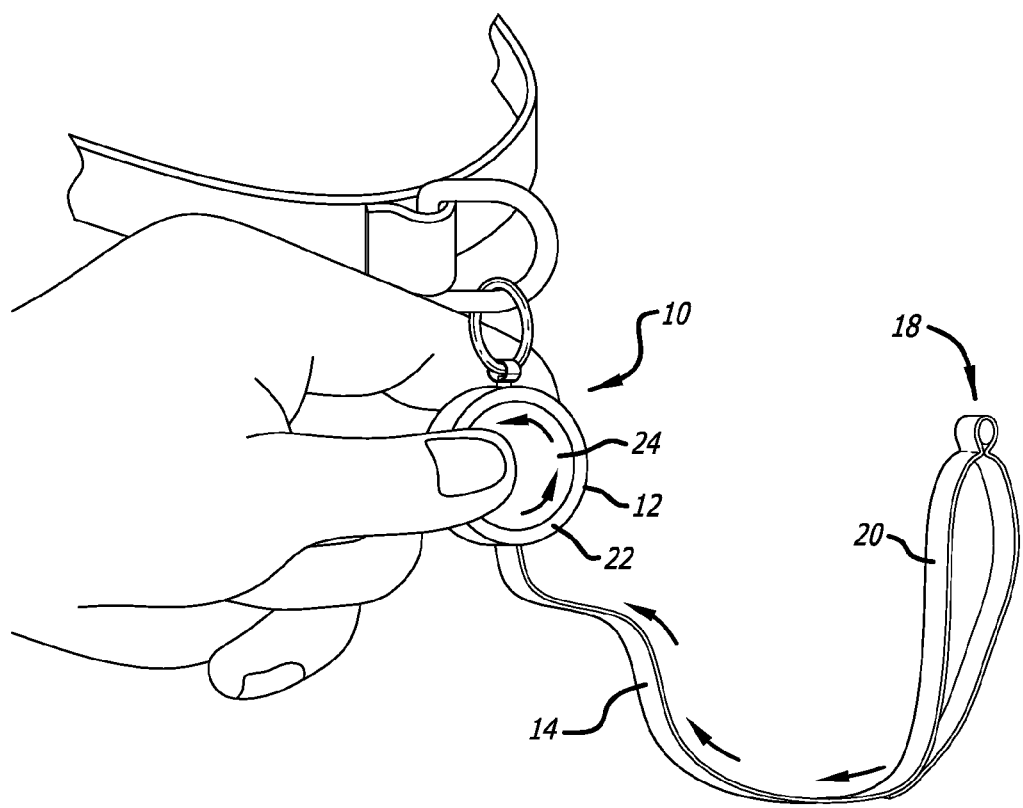
FIG. 2 is a perspective view of the leash of FIG. 1 in an uncoiled or extended configuration.
Figure 3:
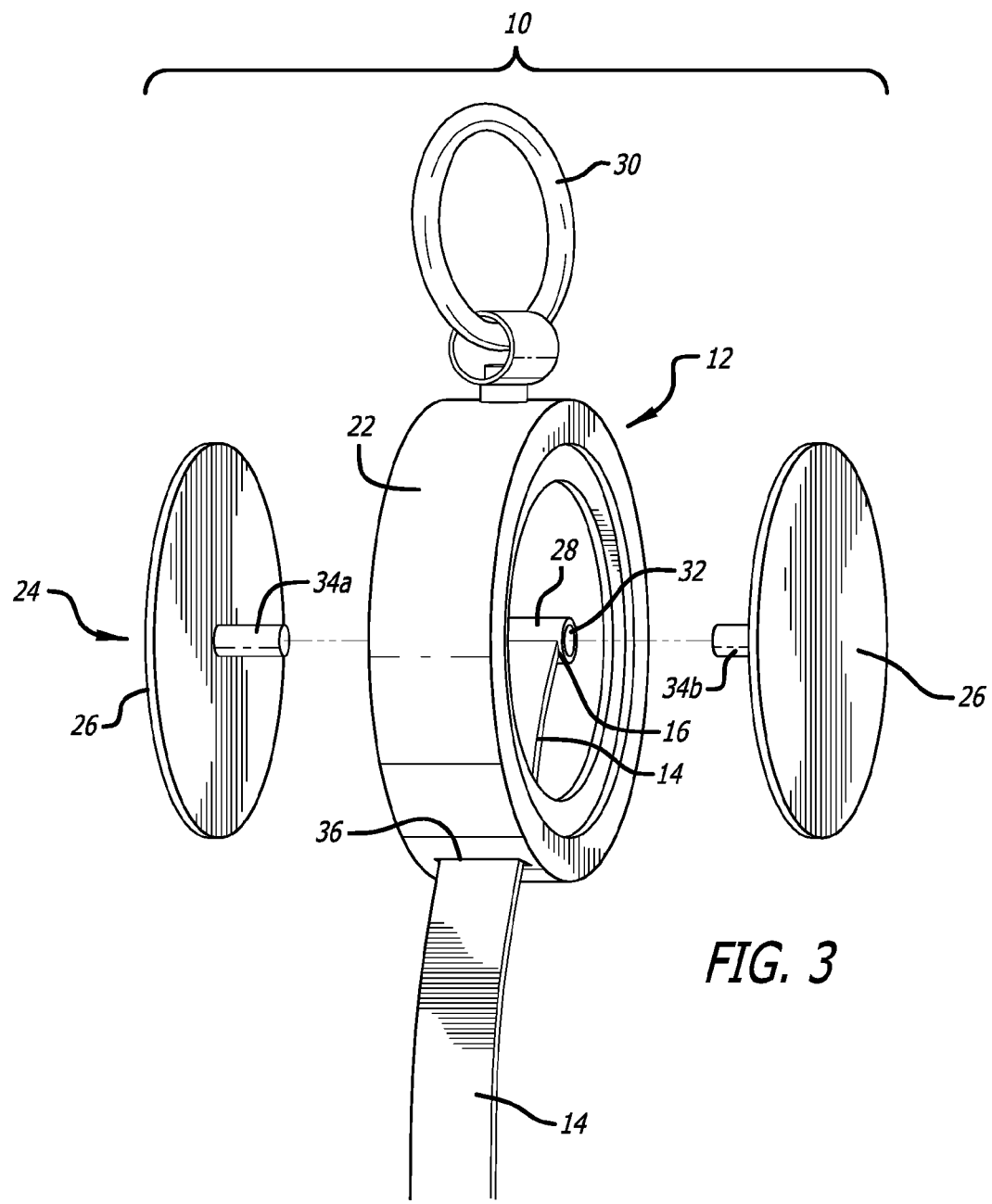
FIG. 3 is an exploded view of the leash of FIG. 1.

As is illustrated in FIGS. 1-3, in a first embodiment, the leash 10 includes a leash container housing 12 configured to contain and dispense a leash strap, cord or tether 14 having a coiled configuration coiled within the container housing and an extended configuration. An inner end 16 of the leash strap, cord or tether is connected to an interior portion of the container housing, and the other, exposed outer end 18 of the leash strap, cord or tether extends a short distance from the container housing in the coiled configuration of the leash strap, cord or tether, such as approximately one or two inches, for example, to allow a user to grasp the leash strap, cord or tether, and pull the exposed outer end from the leash container housing to extend approximately two feet in the extended configuration. The exposed outer end of the leash strap, cord or tether may include a distal handle portion that can be thickened, sewn, include additional material, or otherwise can be constructed to allow a user to grasp the distal end more easily, such as a wrist loop 20, for example, that can be held by the user to manually restrain the pet, or that can be looped over a fixture, such as an indoor or outdoor wall mounted hook, for example, to provide a secure, passive restraint.

The leash container housing is approximately one inch in diameter, and allows a user to always have a leash available to control or restrain an animal or a child. The leash container housing may include a whistle, a glow in the dark, reflective ID tag, such as on one or both of the sides of the container housing, for example. The leash strap, cord or tether typically has a cross-sectional shape that is flat, round, oval, or of any other desired cross-sectional shape, and can be formed of a plastic such as nylon, composite material, fabric, metal, or other similar suitable materials, for example, and can be quickly and simply pulled from the leash container housing until the approximately two foot length of the leash strap, cord or tether has been dispensed.

The leash container housing currently preferably includes an outer circumferential case portion 22 and an inner or middle rotatable spool portion 24 having two opposing sidewalls or rewinding plates 26 and a spindle or leash strap, cord or tether attachment axle 28 fixedly connected between the two opposing sidewalls. The user can manually rotate a middle spool portion of the leash container housing relative to the outer circumferential case portion to rewind the leash for emergency use.

The outer circumferential case portion typically includes a swiveling attachment ring 30 configured to be attached to a collar, chain or harness. The leash strap, cord or tether is attached to the spindle of the inner rotatable spool portion. In one presently preferred aspect, the spindle is generally tubular, including an axially oriented channel 32 configured to receive first and second central cylindrical pin members 34a, 34b extending inwardly from the opposing sidewalls, respectively, in interlocking relationship, such as by an interlocking key on one of the central cylindrical pin members and the spindle, and corresponding grooves on the other of the central cylindrical pin members and the spindle. Alternatively, the inner end of the leash strap, cord or tether can be threaded through a slot extending lengthwise through a major portion of the spindle, and the inner end of the leash strap, cord or tether is enlarged relative to the width of the slot of the spindle, typically being doubled, for example, so as to have a thickness larger than the width of the slot of the spindle.

Referring to FIG. 2, the opposing sidewalls of the spool can be turned or twisted by a user to coil the emergency on the spindle of the spool. As is shown in FIG. 3, an outer end of the leash strap, cord or tether, typically including a wrist loop, is threaded through an outer slot 36 through the outer circumferential case portion, so that when the leash strap, cord or tether is fully wound on the spindle of the spool, the outer end of the leash strap, cord or tether extends through the slot so as to be accessible to a user to allow the user to grasp and unwind the leash strap, cord or tether from the leash container housing as needed. The outer slot through the outer circumferential case portion may be dimensioned to be smaller than the distal thickened handle portion of the tether to prevent the distal thickened handle portion of the tether from being inadvertently pulled into the container housing during rewinding of the leash strap, cord or tether by a user.

Figure 4A:
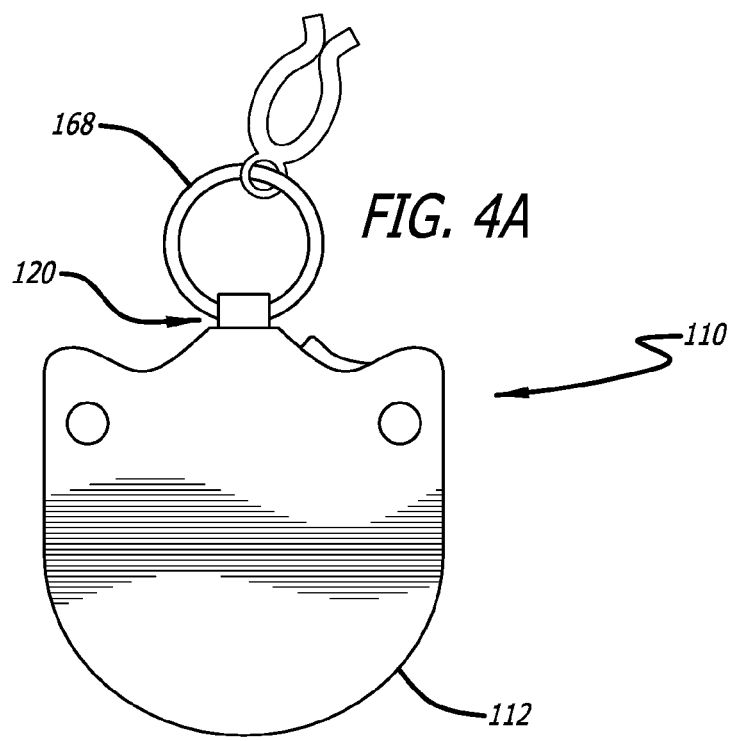
FIGS. 4A and 4B are plan views of smaller and larger versions of a second embodiment of a leash, shown in a coiled or rewound configuration, according to the present invention.
Figure 4B:
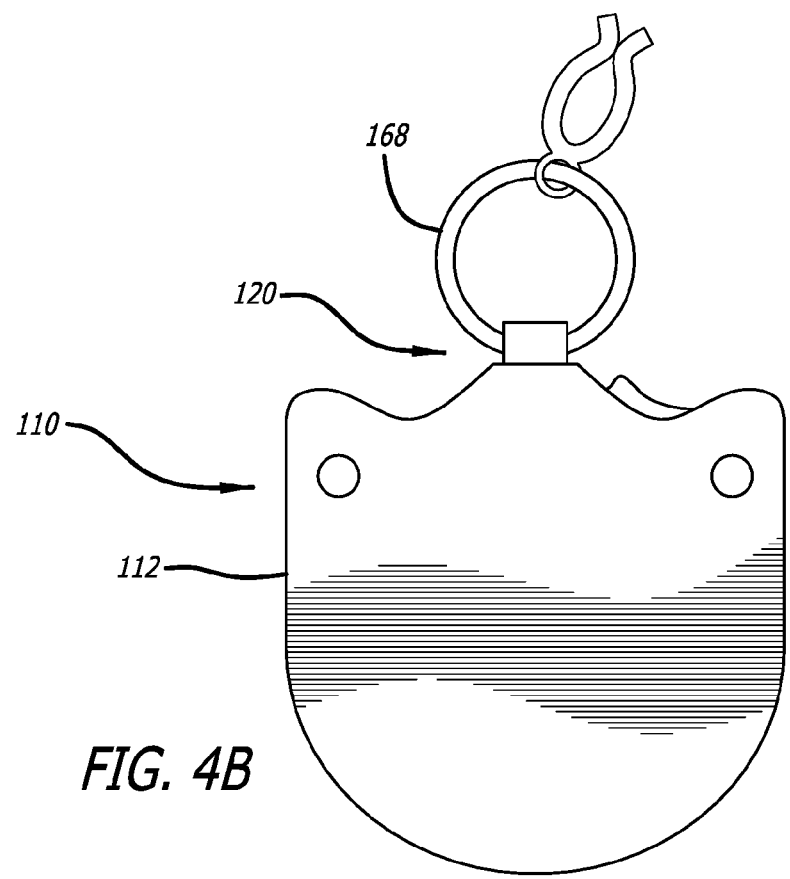

Referring to FIGS. 4A to 9, in a second preferred embodiment, the present invention provides for a self-winding leash 110 in the form of an approximately one inch diameter medallion or pendant similar to a medallion shaped ID tag that is configured to connect to and hang on a connecting ring or a collar, check chain or harness, or any other suitable type of article for restraining or controlling an animal or a child, for example. FIG. 4A illustrates a smaller, lighter weight version of the self-winding leash suitable for use with smaller pets, for example, and FIG. 4B illustrates a larger, heavier duty self-winding leash suitable for use with larger pets or children, for example. The leash includes a container housing 112 configured to contain and dispense a leash strap, cord or tether 114 having a retracted or coiled configuration coiled within the container housing and an extended configuration extending from the container housing. The leash strap, cord or tether typically has a cross-sectional shape that is flat, round, oval, or of any other desired cross-sectional shape, and can be formed of a plastic such as nylon, composite material, fabric, metal, or other similar suitable materials, for example, and can be quickly and simply pulled from the leash container housing until the approximately two foot length of the leash strap, cord or tether has been dispensed.

Figure 6:
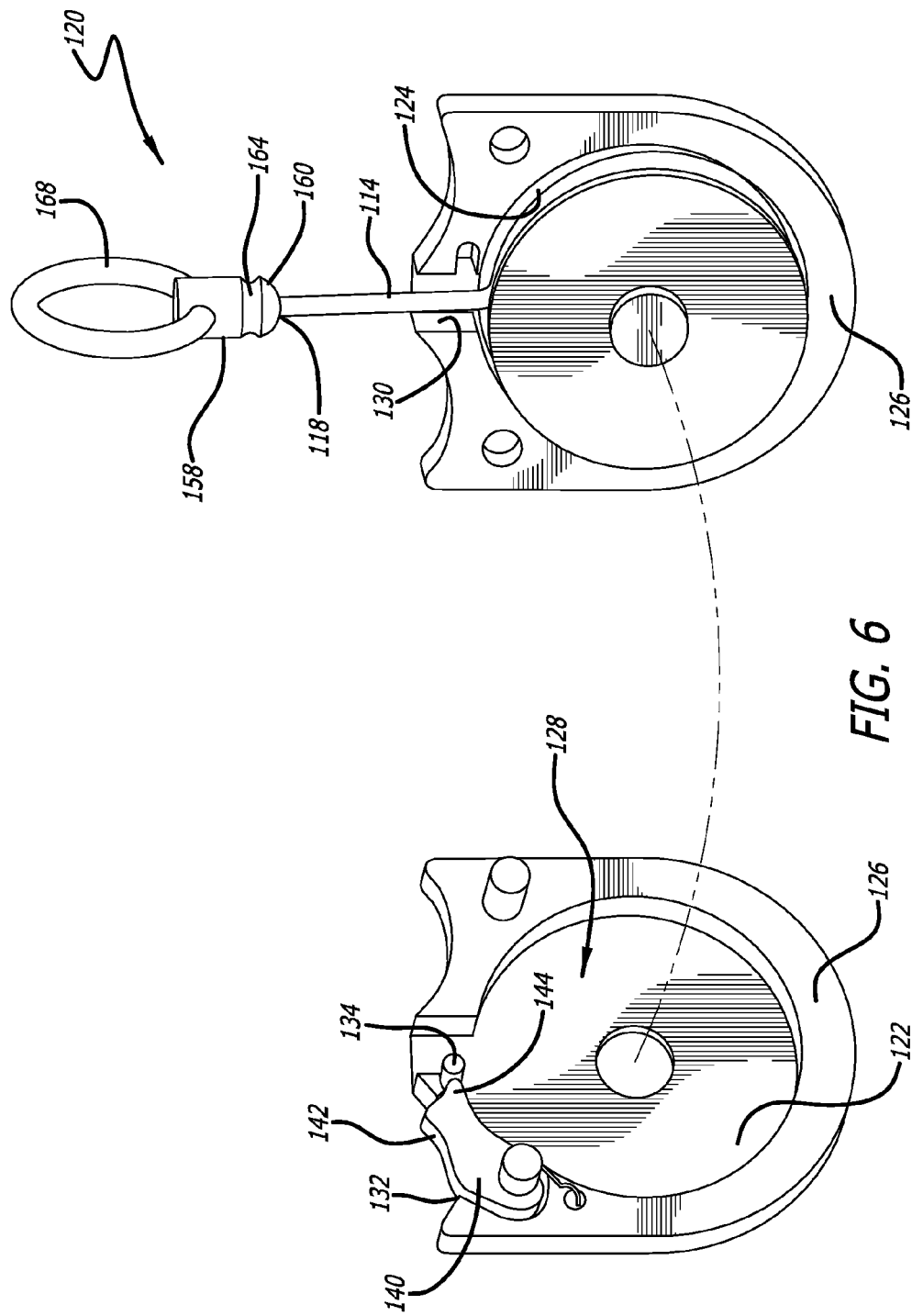
FIG. 6 is an exploded view of the leash of FIGS. 4A and 4B.
Figure 9:
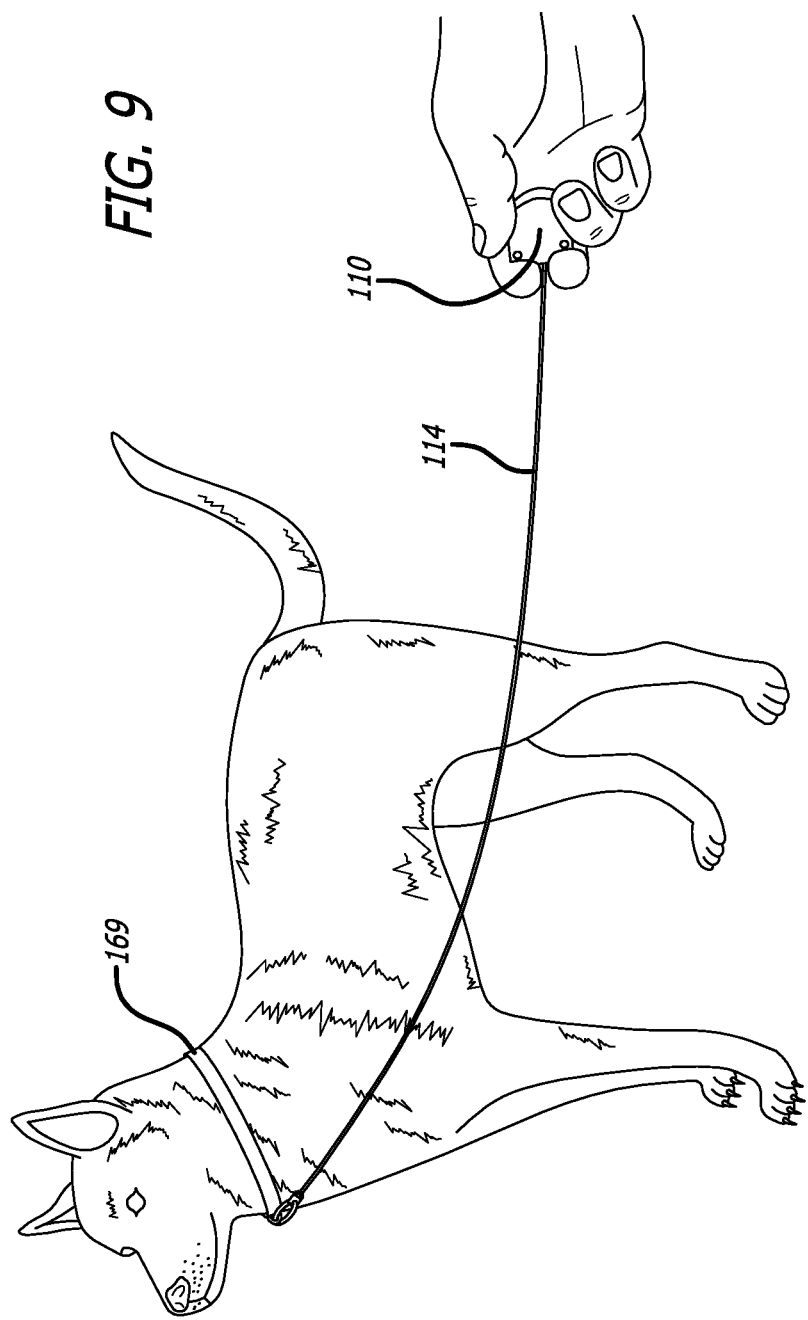
FIG. 9 is perspective view illustrating the leash of FIGS. 4A and 4B secured to a pet collar in an unlatched configuration with the leash strap, cord or tether extended.

Referring to FIGS. 6 and 9, the leash strap, cord or tether has an inner end (not shown) connected within the container housing, as will be explained further below, and an outer, exposed end 118 that extends a short distance from the container housing in the coiled configuration of the leash strap, cord or tether to allow a user to grasp the leash strap, cord or tether, and pull the exposed outer end from the leash container housing to extend approximately two feet in the extended configuration. It has been found that one preferred length of the leash strap, cord or tether is approximately 28 inches, although other similar lengths may also be useful and suitable. The outer end of the leash strap typically includes a connector assembly 120 configured to be attached to a collar, chain or harness, as will be further explained below.

The container housing includes first and second side walls 122, 124, and an outer edge portion 126 defining an interior chamber 128 therebetween. The outer edge portion also preferably includes first and second openings 130, 132 into the container housing. A latch pin 134 is slidably mounted in the interior chamber adjacent to the first opening, such that the latch pin is movable between a latched position 136, shown in FIG. 7, and an unlatched position 138, shown in FIG. 8. A latch control button 140 is also preferably pivotally mounted in the interior chamber adjacent to the latch pin, and includes a first portion 142 extending through the second opening 132 through the container housing and a second portion 144 that abuts the latch pin, and is movable between a first latching control position 146 and a second latching control position 148, such that the latch control button moves the latch pin to the latched position in the first latching control position, and the latch control button releases the latch pin to be free to move to the unlatched position in the second latching control position. The latch control button is preferably biased to the first latching control position, such as by a leaf spring 150, for example, and the second portion of the latch control button moves to release the latch pin to be free to move to the unlatched position when the first portion of the latch control button is pressed inwardly within the interior chamber of the container housing.

The leash strap, cord or tether is preferably biased to be in the coiled, retracted configuration by a biasing member 152 as is well known in the art, such as a coil spring or elastic band, for example, that is typically disposed in the interior chamber and fixedly attached at an inner end of the biasing member to a portion of the container housing. The inner end of the leash strap is preferably connected to an outer end of the biasing member, and the leash strap is preferably biased to be in the retracted configuration by the biasing member, with the outer end of the leash strap extending through the first opening of the container housing.

Figure 7:
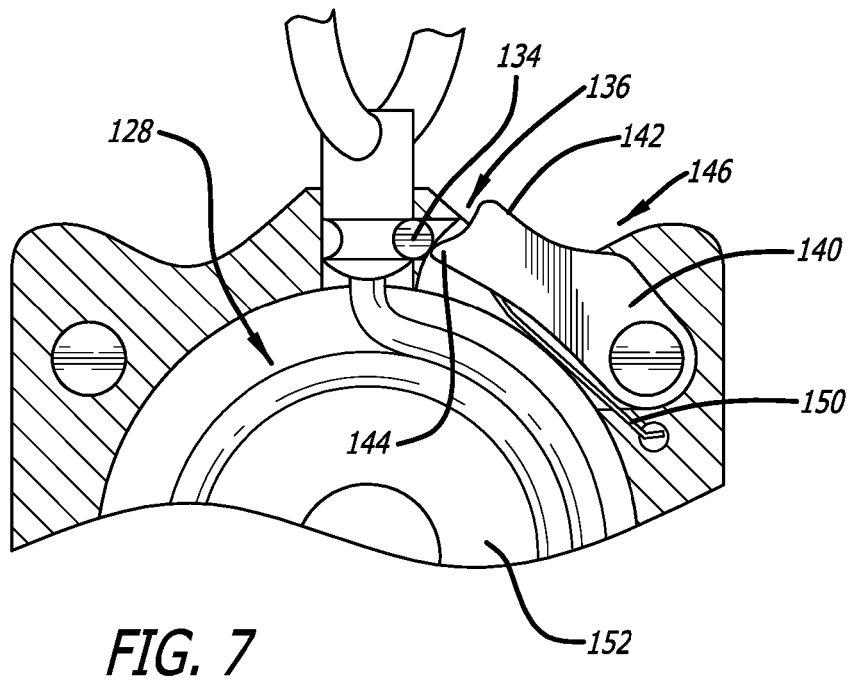
FIG. 7 is a partial sectional view of the leash of FIGS. 4A and 4B showing the leash in a latched configuration.
Figure 8:
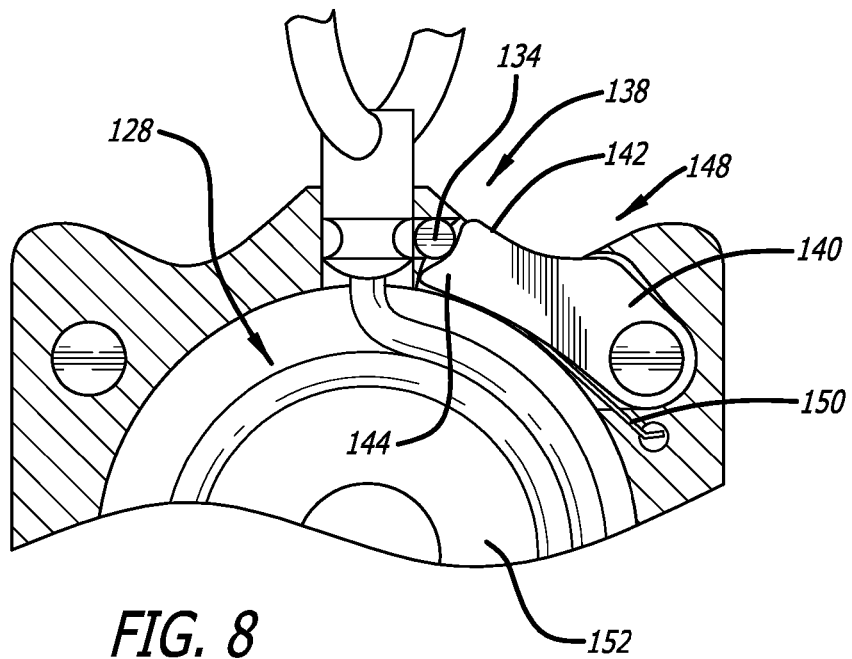
FIG. 8 is a partial sectional view of the leash of FIGS. 4A and 4B similar to FIG. 7 showing the leash in an unlatched configuration.

Referring to FIGS. 6-8, in one presently preferred aspect, the connector assembly includes a cylindrical stem 158 connected to the outer end of the leash strap, cord or tether. The cylindrical stem has an end portion 160 with an outer cylindrical surface defining a recess or notched portion 164 configured to receive the latch pin in the latched position when the leash strap is in the retracted configuration. The recess or notched portion typically is formed as an outer circumferential channel extending around the outer cylindrical surface of the cylindrical stem. The connector assembly also preferably includes a collar connector ring 168 configured to be attached to a collar, chain or harness, such as a leather or fabric pet collar that fits around and can be buckled around the neck of a pet, for example.

Figure 5:
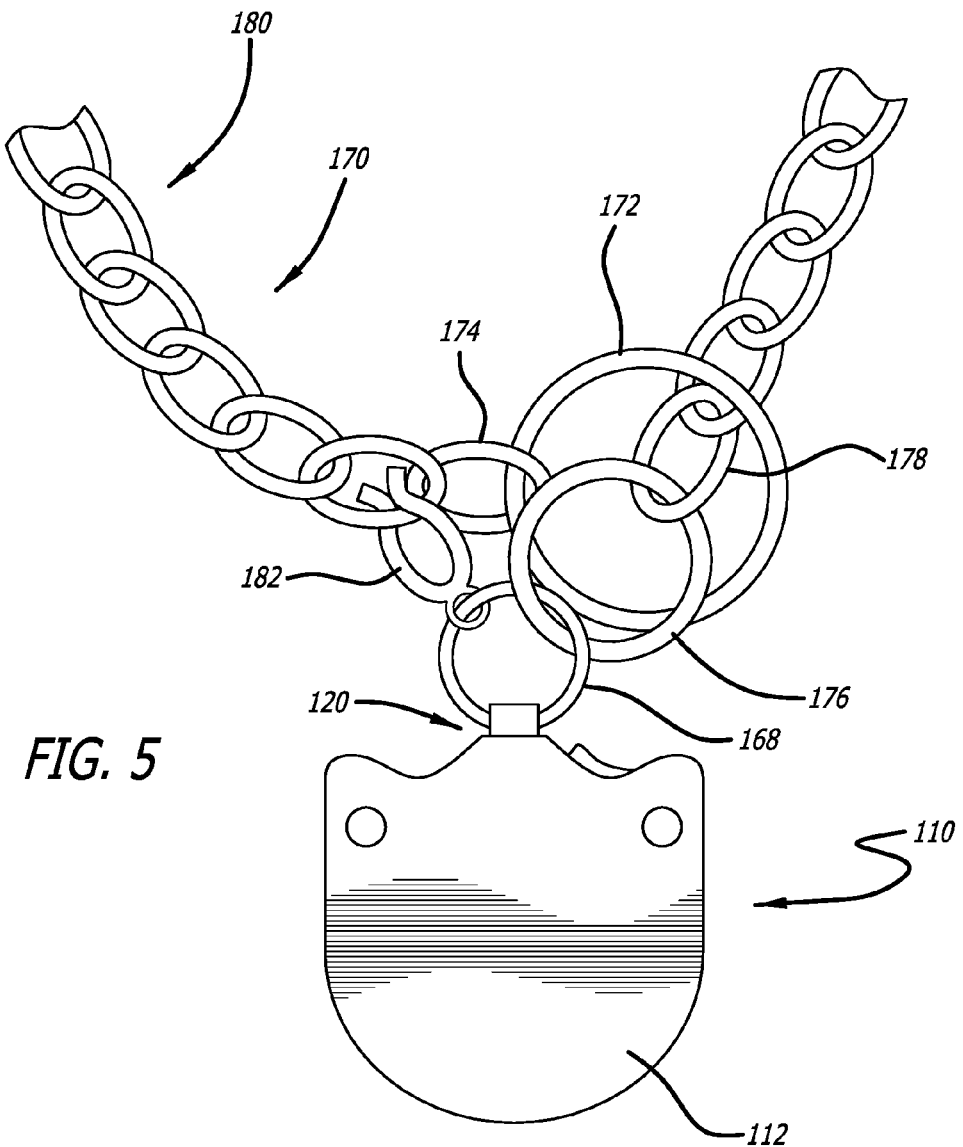
FIG. 5 is a plan view of the leash of FIGS. 4A and 4B shown attached to a check chain.

Alternatively, as is illustrated in FIG. 5, the leash may be connected to and carried on a check chain, slip collar, or choke collar 170. Such a check chain typically includes a guide ring 172 at a first end 174 and a leash connector ring 176 at a second end 178, the check chain forming a loop 180 extending through the guide ring. When the pet collar is such a check chain or another similar kind of collar, a clip 182, such as a "figure 8" plastic spring clip, for example, may also optionally be provided that is configured to removably connect the collar connector ring of the connector assembly to a portion of the chain, such as at or near the guide ring, for example, to support the weight of the container housing while the collar connector ring is connected to the leash connector ring of the check chain until the leash strap is pulled by a user from the retracted configuration to the extended configuration. Alternatively, other similar types of removable fasteners, such as hook and loop fasteners, for example, may also be suitable to removably connect the leash or the leash container housing to a collar, chain, harness or another suitable type of article for restraining or controlling an animal or a child, for example, to temporarily support the weight of the leash and container housing.

As is illustrated in FIGS. 10-20, in another embodiment, the present invention provides for a manually operated emergency leash 210 in the form of an approximately one inch diameter medallion or pendant similar to a medallion shaped ID tag that is configured to connect to and hang on a connecting ring or a pet's collar or choke chain, for example. The emergency leash includes a container housing 212 configured to contain and dispense a leash strap, cord or tether 214 having a coiled configuration coiled within the container housing and an extended configuration extending from the container housing, as shown in FIG. 15. The leash strap, cord or tether typically has a cross-sectional shape that is flat, round, oval, or of any other desired cross-sectional shape, and can be formed of a plastic such as nylon, composite material, fabric, metal, ultra high molecular weight polyethylene (UHMW PE) available under the brand name SPECTRA from Honeywell, or other similar suitable materials, for example, and can be quickly and simply pulled from the leash container housing until the approximately two foot length of the leash strap, cord or tether has been dispensed.

The leash strap, cord or tether has an inner end 216 connected within the container housing, as will be explained further below, and an outer, exposed end 218 that extends a short distance from the container housing in the coiled configuration of the leash strap, cord or tether to allow a user to grasp the leash strap, cord or tether, and pull the exposed outer end from the leash container housing to extend approximately two feet in the extended configuration. It has been found that one preferred length of the leash strap, cord or tether is 28 inches, although other similar lengths may also be useful and suitable. The outer end of the leash strap, cord or tether typically includes a collar connector assembly 220 configured to be attached to a pet collar, as will be further explained below.

The emergency leash container housing is approximately one inch in diameter, and allows a pet owner to always have control of their pet. The emergency leash container housing may include a glow in the dark, reflective ID tag, such as on one or both sides of the container housing, for example. The emergency leash container housing includes a stationary outer circumferential case portion 222 and an inner or middle fixed spool portion 224 fixedly attached to a side wall 226 of the container housing that is fixedly attached to the stationary outer circumferential case portion. A fixed middle rewinding spindle, rod, pin, tube or spool 228 is fixedly attached at a first or inner end 230 to the container side wall and extends from the container side wall substantially perpendicular to the side wall of the container housing. A second or outer end 232 of the fixed middle rewinding spindle, rod, pin, tube or spool is fixedly, rigidly attached to an outer rewinding plate or center section 234 that extends only partially toward the stationary outer circumferential case portion, leaving a rewinding slot 236 open around the outer rewinding plate so that a user can manually rewind the leash around the fixed middle rewinding spindle, rod, pin, tube or spool to be ready for use, as is illustrated in FIG. 15.

Figure 10:
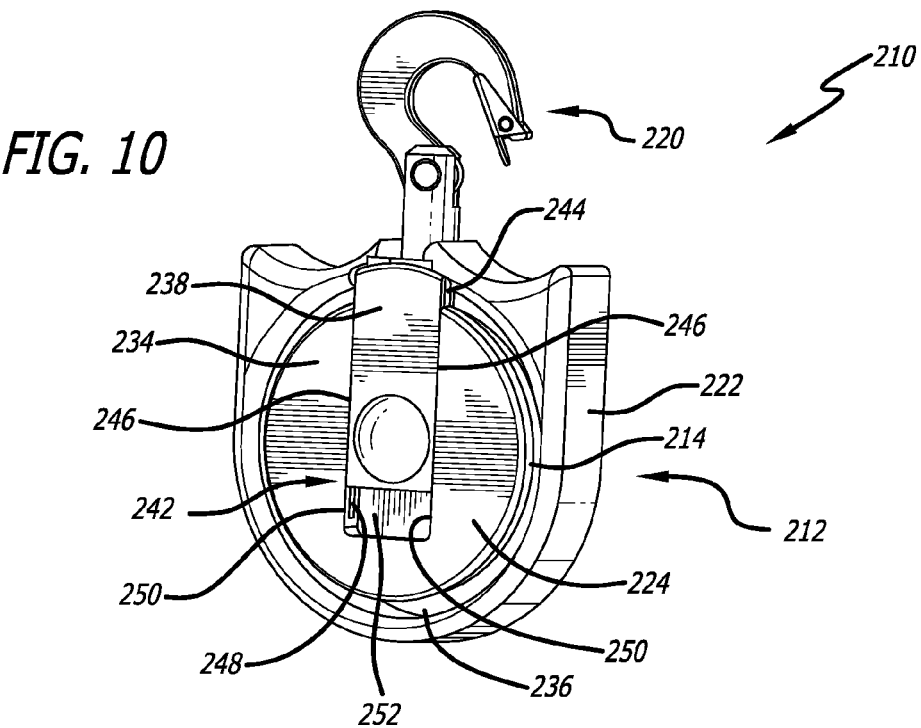
FIG. 10 is a front perspective view of the leash according a third embodiment of the present invention, showing the leash strap, cord or tether coiled.
Figure 11:
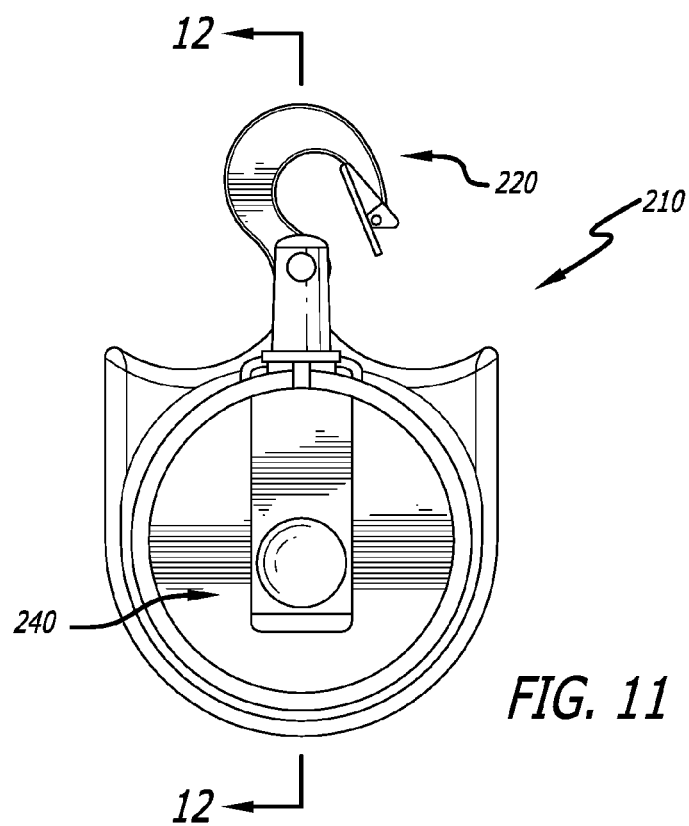
FIG. 11 is a front plan view of the leash of FIG. 10.

Referring to FIGS. 10, 11 and 15, the manually operated emergency leash further includes a sliding lock or latch member 238 that is slidably movable between an open, unlocked or unlatched position 240, illustrated in FIGS. 11 and 15, in which the leash strap, cord or tether can be wound or unwound from the fixed middle rewinding spindle, rod, pin, tube or spool, and a closed, locked or latched position 242, illustrated in FIG. 10, in which the leash strap, cord or tether is prevented from being wound or unwound from the fixed middle rewinding spindle, rod, pin, tube or spool. The sliding lock or latch member typically has ridges 244 along the opposing longitudinal side edges 246 of the sliding lock or latch member that are slidably movable along grooves 248 formed in opposing longitudinal side edges 250 of a channel 252 formed in the outer rewinding plate or center section.

As is illustrated in FIG. 18, the exposed outer end of the leash strap, cord or tether includes an enlarged end portion 262, typically a knot, for example, that is connected to the collar connector assembly. The collar connector assembly preferably includes a tubular stem 264 configured to be received in a slot or inset portion 266 of the outer circumferential case. The tubular stem includes an inner chamber 268 having an interior lip portion 270 configured to receive and retain the enlarged end portion of the outer end of the leash strap, cord or tether. A hook portion 272, typically formed of a metal such as steel, for example, is connected at a base 274 of the hook portion to an outer end portion 276 of the tubular stem, typically by a pivot pin 278 extending through the base of the hook portion, and an outer end 280 of the hook portion preferably includes a spring loaded latch assembly 282, having a hook latch member 283 pivotally connected to the outer end of the hook portion and pivotally movable between an open position, leaving an entrance slot 284 of the hook portion open, and a closed position 286 substantially bridging and blocking or closing the entrance slot, as is illustrated in FIGS. 15, 16 and 18.

Figure 20:
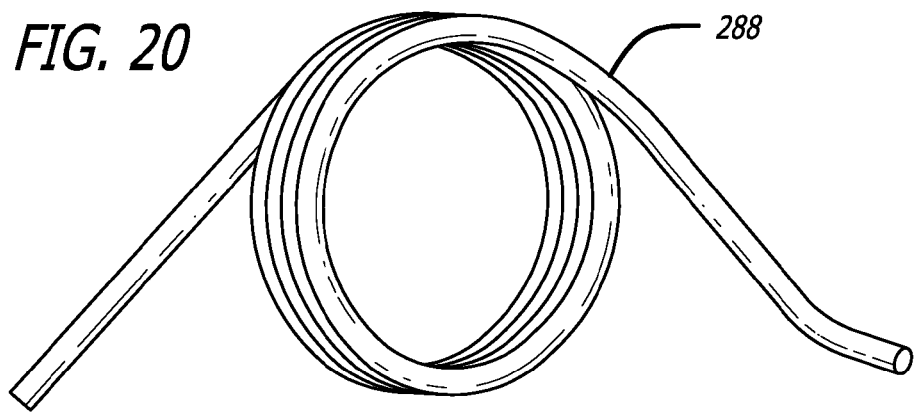
FIG. 20 is a perspective view of the torsion spring of the collar assembly of FIG. 16.
Figure 21:
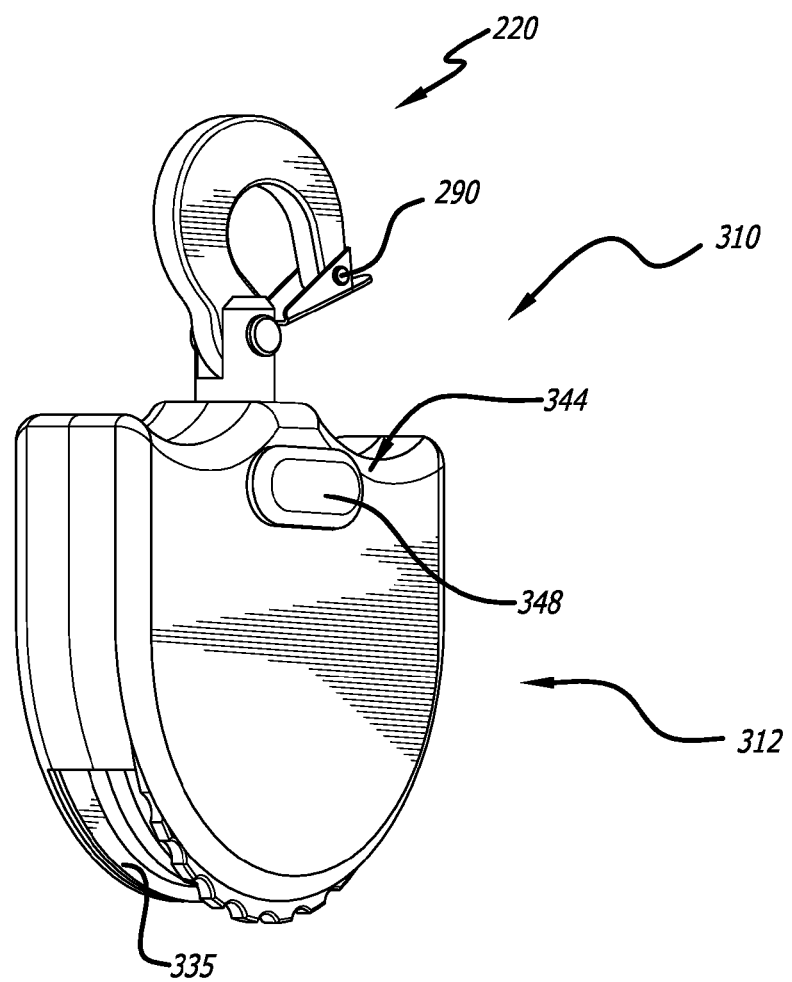
FIG. 21 is a front perspective view of the leash according a fourth embodiment of the present invention, showing the leash strap, cord or tether coiled.
Figure 22:
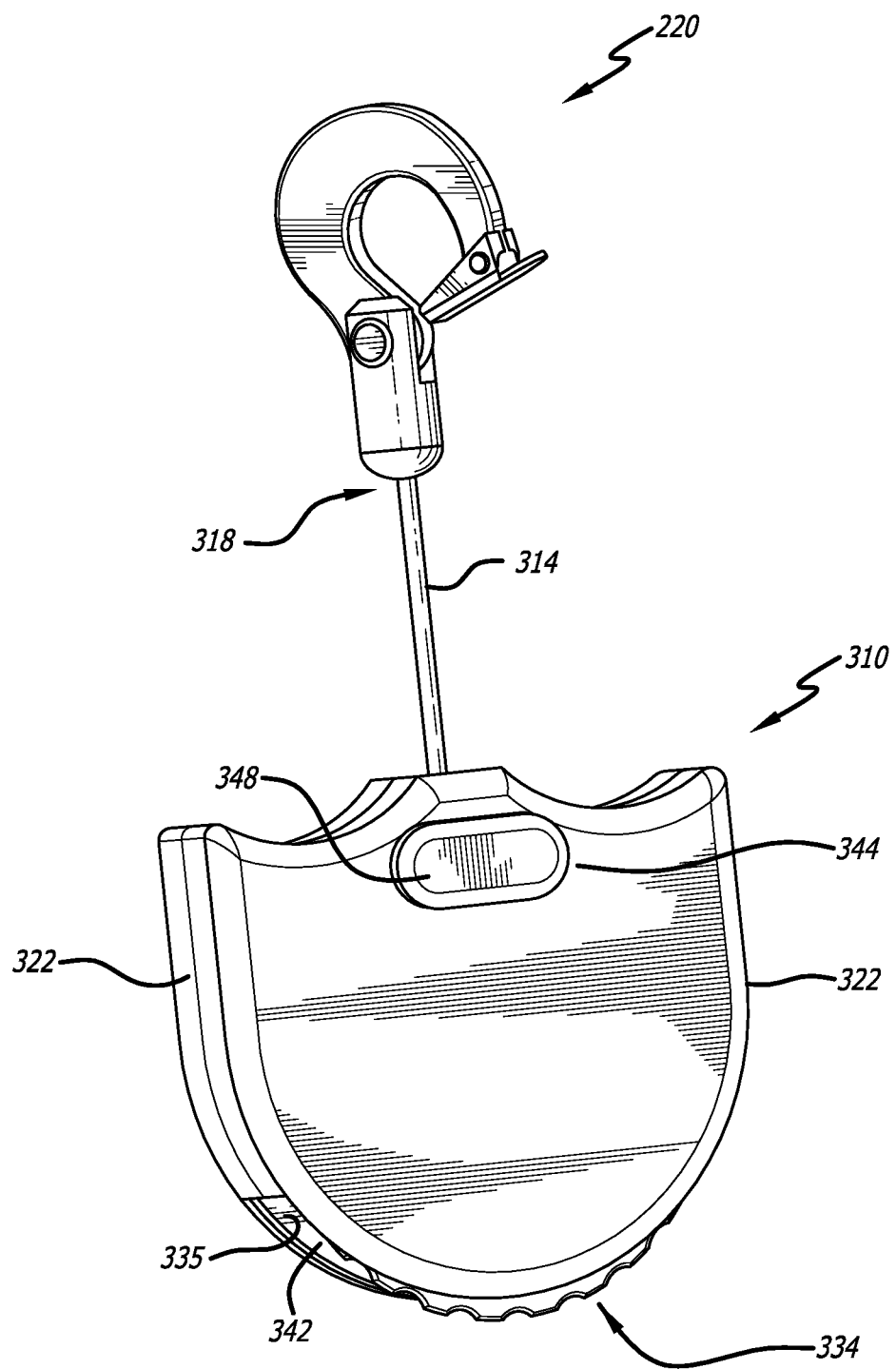
FIG. 22 is a front perspective view of the leash of FIG. 21, showing the leash strap, cord or tether partially uncoiled.

Referring to FIGS. 18 and 20, the hook latch member is preferably biased to be in the closed position substantially bridging and closing the entrance slot, such as by a torsion spring 288 positioned around a hook latch member pivot pin 290 pivotally connecting the hook latch member to the outer end of the hook portion, so that a user can rapidly deploy the leash from the container housing and latch the hook portion to a connector ring of a pet collar or choke chain, for example.

The manually operated leash can hang from a pet collar ready for use, allowing a user to grab the container housing, and sliding the latch member to the open position to unwind the leash strap, cord or tether a desired distance, at which point the user can slide the latch member to the closed position to lock the leash strap, cord or tether in the desired length. After use, the spring loaded hook connector assembly can be unhooked from the pet's collar by pressing the hook latch to the open position, and the leash strap, cord or tether can be rewound into the leash container housing by sliding the latch member to the open position, and then sliding the latch member to the closed position to lock the leash strap, cord or tether rewound in the container housing, and the spring loaded hook connector assembly can be snapped back onto a pet's collar, ready for use.

As is illustrated in FIGS. 21-28, in another presently preferred embodiment, the present invention provides for a manually operated leash 310 in the form of an approximately one inch diameter medallion or pendant similar to a medallion shaped ID tag that is configured to connect to and hang on a connecting ring or a pet's collar or choke chain, for example. The leash includes a container housing 312 configured to contain and dispense a leash strap, cord or tether 314 having a coiled configuration coiled within the container housing and an extended configuration extending from the container housing. The leash strap, cord or tether typically has a cross-sectional shape that is flat, round, oval, or of any other desired cross-sectional shape, and can be formed of a plastic such as nylon, composite material, fabric, metal, ultra high molecular weight polyethylene (UHMW PE) available under the brand name SPECTRA from Honeywell, or other similar suitable materials, for example, and can be quickly and simply pulled from the leash container housing until the approximately two foot length of the leash strap, cord or tether has been dispensed.

The leash strap, cord or tether has an inner end 316 connected within the container housing, as will be explained further below, and an outer, exposed end 318 that extends a short distance from the container housing in the coiled configuration of the leash strap, cord or tether to allow a user to grasp the leash strap, cord or tether, and pull the exposed outer end from the leash container housing to extend approximately two feet in the extended configuration. It has been found that one preferred length of the leash strap, cord or tether is 28 inches, although other similar lengths may also be useful and suitable. The outer end of the leash strap, cord or tether typically includes a collar connector assembly 220 configured to be attached to a pet collar, as described above.

The emergency leash container housing is approximately one inch in diameter, and allows a pet owner to always have control of their pet. The emergency leash container housing may include a glow in the dark, reflective ID tag, such as on one or both of the sides of the container housing, for example. The emergency leash container housing includes a stationary outer circumferential case portion 322 including a leash strap opening 323 extending through the stationary outer circumferential case portion, and through which the leash strap extends, and an inner or middle rotatable spool portion 324 rotatably mounted between first and second side walls 326a, 326b of the container housing that are fixedly attached to the stationary outer circumferential case portion over a fixed middle spindle, rod, pin, or tube 328 that includes a first spindle portion 328a fixedly attached at a first spindle outer end 330*a* to the first container side wall and that extends from the container side wall substantially perpendicular to the first container side wall, and a second spindle portion 328*b* fixedly attached at a second spindle outer end 330*b* to the second container side wall and that extends from the container side wall substantially perpendicular to the second container side wall. Referring to FIG. 28, the inner or middle rotatable spool portion typically includes and aperture 331 through which the inner end of the leash strap, cord or tether can be fixedly connected to the rotatable spool portion. The inner ends 332*a*, 332*b* of the first and second spindle portions are configured to be disposed adjacent to each other or connected when the emergency leash container housing is assembled to form the fixed middle spindle, rod, pin, or tube.

As can best be seen in FIGS. 27A, 27B and 28, the inner or middle rotatable spool portion advantageously includes a substantially circular outer thumb wheel 334 rigidly affixed to an outer end of the inner or middle rotatable spool portion and disposed interior to and adjacent to one of the container side walls, and an opposing spool end plate 335 rigidly affixed at an inner end of the inner or middle rotatable spool portion and disposed interior to and adjacent to the other of the container side walls. The thumb wheel includes an outer edge 336, preferably including ridges 338 and grooves 340, and the outer edge of the thumb wheel extends radially outwardly through a rewinding slot 342 at a portion of the stationary outer circumferential case portion typically opposite the collar connector assembly.

Referring to FIGS. 21, 22, 27A, and 27B, the manually operated leash further includes a spring loaded lock or latch member 344 slidably mounted to a portion of the container housing, and slidably movable between an outwardly extending closed, locked or latched position 346*a*, and an inwardly pressed open, unlocked or unlatched position 346*b*. The spring loaded lock or latch member includes a button portion 348 preferably disposed outwardly of one of the container side walls, and first and second generally cylindrical latch pins 350 preferably extending inwardly through one or more apertures 351 through this container side wall into the interior chamber of the container housing, past the thumb wheel. Each of the first and second generally cylindrical latch pins includes a first shaft portion 352 connected to the button portion and having a first diameter and a second shaft portion 354 having a second diameter that is larger than the first diameter and suitably dimensioned and configured to engage the grooves between the ridges of the thumb wheel and prevent rotation of the thumb wheel when the spring loaded lock or latch member is in the outwardly extending closed, locked or latched position, and configured to be disengaged from the grooves of the thumb wheel and allow rotation of the thumb wheel in the inwardly pressed open, unlocked or unlatched position. The spring loaded lock or latch member is biased to be in the outwardly extending closed, locked or latched position by springs 356 at the inner ends 358 of the generally cylindrical latch pins.

As is illustrated in FIGS. 21-26, in the fourth embodiment, the exposed outer end of the leash strap, cord or tether can also be connected to the collar connector assembly, such as by an enlarged end portion, typically a knot, for example, as described above with reference to FIGS. 16-20.

The manually operated leash can hang from a pet collar ready for use, allowing a user to grab the container housing, and pressing the spring loaded lock or latch member to release the thumb wheel to freely rotate and allow the leash strap, cord or tether to unspool a desired distance, at which point the user can release the spring loaded lock or latch member to lock the leash strap, cord or tether in the desired length. After use, the spring loaded hook connector assembly can be unhooked from the pet's collar by pressing the hook latch to the open position, and the leash strap, cord or tether can be rewound into the leash container housing by pressing the spring loaded lock or latch member to release the thumb wheel to freely rotate and turning the thumb wheel to rewind the leash strap, cord or tether into the leash container housing. The user can release the spring loaded lock or latch member to lock the leash strap, cord or tether in position, and the spring loaded hook connector assembly can be snapped back onto a pet's collar, ready for use.

The open rewinding slot in the stationary outer circumferential case portion allows for air flow, permitting the interior chamber and leash strap, cord or tether to dry, and permitting debris to fall out of the interior chamber. The leash strap, cord or tether can be fully deployed to wash the leash strap, cord or tether as well as the interior chamber of the leash container housing, making it easy for a user to keep the leash clean.

In each of the foregoing embodiments, the leash container housing is approximately one inch in diameter, and allows a pet owner to always have control of their pet. The leash container housing may optionally include a whistle, a glow in the dark, reflective ID tag, such as on one or both of the sides of the container housing, for example, which may also include identifying information such as an identification number for the leash that can be registered, for example, or other contact information, for example. In another aspect, the container housing may include an LED light configured to be switched on when the leash strap is in the extended configuration. In another aspect, the container housing may include a GPS locating device configured to identify and transmit the location of the container housing.

It will be apparent from the foregoing that while particular forms of the invention have been illustrated and described, various modifications can be made without departing from the spirit and scope of the invention. For example, features illustrated and described with respect to one embodiment of the present invention can be included in other described embodiments of the present invention. Accordingly, it is not intended that the invention be limited, except as by the appended claims.

What is claimed is:

1. A leash configured to be connected to an article for restraining or controlling an animal or a child, comprising:
  a leash container housing including a stationary outer circumferential case portion, a first container side wall and a second container side wall fixedly attached to said stationary outer circumferential case portion and defining an interior chamber therein, a rewinding slot being defined at a radially outer portion of said stationary outer circumferential case, and a leash strap opening being defined in said stationary outer circumferential case portion;
  a fixed spindle extending between said first container side wall and second container side wall substantially perpendicular to said first container side wall and second container side wall;
  an inner rotatable spool portion rotatably mounted between the first container side wall and second container side wall over said fixed spindle, said inner rotatable spool portion including a substantially circular outer thumb wheel rigidly affixed to an outer end of said inner rotatable spool portion and disposed interior to and adjacent to one of said first container side wall and second container side wall, said thumb wheel including an outer edge including a plurality of ridges and grooves, said outer edge and said plurality of ridges and grooves extending radially outward through said rewinding slot to permit a user to turn said inner rotatable spool portion by turning said plurality of ridges and grooves of said thumb wheel; and a leash strap having an inner end and an outer end, said leash strap extending through said leash strap opening in said stationary outer circumferential case portion, said leash strap having a coiled configuration coiled within the container housing and an extended configuration extending from the container housing.

2. The leash of claim 1, wherein said fixed spindle includes a first spindle portion and a second spindle portion, said first spindle portion having a first spindle portion inner end and a first spindle portion outer end, said first spindle portion outer end being fixedly attached to one of said first container side wall and second container side wall and extending from said one of said first container side wall and second container side wall substantially perpendicular to said first container side wall and second container side wall, said second spindle portion having a second spindle inner end and a second spindle portion outer end, said second spindle portion outer end being fixedly attached to the other of said first container side wall and second container side wall and extending from said other of said first container side wall and second container side wall substantially perpendicular to said first container side wall and second container side wall, and said first and second spindle portion inner ends being disposed adjacent to each other.

3. The leash of claim 1, further comprising a latch member slidably movable between an outwardly extending latched position and an inwardly extending unlatched position, said latch member being biased to be in the outwardly extending latched position.

4. The leash of claim 3, wherein said latch member includes a button portion disposed outwardly of one of the first container side wall and second container side wall, and first and second latch pins extending inwardly through at least one aperture through one of said first container side wall and second container side wall into the interior chamber of the container housing over said grooves of said thumb wheel, each of said first and second latch pins including a first shaft portion and a second shaft portion, said first shaft portion being connected to said button portion and having a first diameter, and said second shaft portion having a second diameter that is larger than the first diameter, said second shaft portion being dimensioned and configured to engage said grooves of said thumb wheel and prevent rotation of said thumb wheel when said latch member is in said outwardly extending latched position, and said first shaft portion connected to said button portion being dimensioned and configured to permit rotation of said thumb wheel when said latch member is in said inwardly extending unlatched position.

5. The leash of claim 4, wherein said latch member is configured to allow the leash strap to unspool a desired length when the latch member is in the inwardly extending unlatched position, and wherein said latch member is configured to lock the leash strap at the desired length when the latch member is released into the outwardly extending latched position.

6. The leash of claim 1, further comprising a collar connector assembly connected to said outer, exposed end of said leash strap, said collar connector assembly including a tubular stem having an inner end portion and an outer end portion, said tubular stem being configured to be received in a slot of the outer circumferential case, and said collar connector assembly being configured to be removably attached to a pet collar.

7. The leash of claim 6, wherein said collar connector assembly includes a hook portion having a base connected to the outer end portion of the tubular stem and an outer end configured to be removably attached to the pet collar, wherein said base of said hook portion is connected to said outer end portion of said tubular stem by a pivot pin extending through said base of said hook portion, wherein said outer end of said hook portion includes a spring loaded latch assembly having a hook latch member pivotally connected to the outer end of the hook portion and pivotally movable between an open position and a closed position, said hook latch member leaving an entrance slot of the hook portion open in said open position, and said hook latch member substantially bridging and closing the entrance slot in said closed position, and wherein said hook latch member is biased to be in the closed position substantially bridging and closing the entrance slot.

8. The leash of claim 6, wherein said outer end of said leash strap includes an enlarged portion, and said tubular stem of said collar connector assembly includes an inner chamber having an interior lip portion configured to receive and retain the enlarged end portion of the outer end of the leash strap.

9. The leash of claim 1, wherein said inner rotatable spool portion includes a spool end plate rigidly affixed at an inner end of the inner rotatable spool portion and disposed interior to and adjacent to the other of said first container side wall and second container side wall.

10. The leash of claim 1, further comprising a biasing member having an inner end and an outer end, said biasing member being disposed in said interior chamber and fixedly attached at the inner end of the biasing member to a portion of said container housing, said inner end of said leash strap being connected to said outer end of said biasing member, and said leash strap being biased to be in said coiled configuration by said biasing member.

11. The leash of claim 1, further comprising:
a connector assembly including a cylindrical stem connected to said outer end of said leash strap, said cylindrical stem including an end portion with an outer surface defining a recess, said recess including an outer circumferential channel extending around the outer surface of said cylindrical stem;
a latch pin slidably mounted in the interior chamber adjacent to a first opening through the leash container housing, said latch pin being movable between a latched position and an unlatched position, said recess of said cylindrical stem being configured to receive said latch pin in said latched position when said leash strap is in said coiled configuration; and
a latch control button mounted adjacent to said latch pin and having a first portion extending through a second opening through said leash container housing and a second portion abutting said latch pin, said latch control button being pivotally mounted in the interior chamber and movable between a first latching control position and a second latching control position, said latch control button moving said latch pin to said latched position in said first latching control position, and said latch control button releasing said latch pin to be free to move to said unlatched position in said second latching control position, said latch control button being biased to said first latching control position, and said second portion of said latch control button moving to release said latch pin to be free to move to said unlatched position when said first portion of said latch control button is pressed inwardly within said interior chamber of said container housing.

12. The leash of claim 11, wherein said connector assembly comprises a collar connector ring, wherein the article comprises a check chain including a guide ring at a first end and a leash connector ring at a second end, the check chain forming a loop extending through said guide ring, and further comprising a clip configured to removably connect said collar connector ring of said connector assembly to said guide ring to support the container housing while said collar connector ring is connected to said leash connector ring of the check chain until said leash strap is moved from said retracted position.

13. The leash of claim 1, wherein the leash is configured to be attached to any collar, chain or harness.

14. The leash of claim 1, wherein the leash is adapted to be always available to a user for controlling or restraining an animal or child.

15. The leash of claim 1, wherein the leash container housing includes at least one of a whistle, a glow in the dark, reflective ID tag, an LED light, a GPS locating device, or identifying information on at least one of the first container side wall and second container side wall for reuniting a user with a lost animal connected to the leash.

16. A leash configured to be connected to an article for restraining or controlling an animal or a child, comprising:
a leash container housing including a stationary outer circumferential case portion, a first container side wall and a second container side wall fixedly attached to said stationary outer circumferential case portion and defining an interior chamber therein, and a leash strap opening being defined in said stationary outer circumferential case portion;
a fixed spindle extending between said first container side wall and second container side wall substantially perpendicular to said first container side wall and second container side wall;
an inner rotatable spool portion rotatably mounted between the first container side wall and second container side wall over said fixed spindle;
a leash strap having an inner end and an outer end, said leash strap extending through said leash strap opening in said stationary outer circumferential case portion, said leash strap having a coiled configuration coiled within the container housing and an extended configuration extending from the container housing;
a connector assembly including a cylindrical stem connected to said outer end of said leash strap, said cylindrical stem including an end portion with an outer surface defining a recess;
a latch pin slidably mounted in the interior chamber adjacent to a first opening through the leash container housing, said latch pin being movable between a latched position and an unlatched position, said recess of said cylindrical stem being configured to receive said latch pin in said latched position when said leash strap is in said coiled configuration; and
a latch control button mounted adjacent to said latch pin and having a first portion extending through a second opening through said leash container housing and a second portion abutting said latch pin, said latch control button being pivotally mounted in the interior chamber and movable between a first latching control position and a second latching control position, said latch control button moving said latch pin to said latched position in said first latching control position, and said latch control button releasing said latch pin to be free to move to said unlatched position in said second latching control position, said latch control button being biased to said first latching control position, and said second portion of said latch control button moving to release said latch pin to be free to move to said unlatched position when said first portion of said latch control button is pressed inwardly within said interior chamber of said container housing.

17. The leash of claim 16, further comprising a biasing member having an inner end and an outer end, said biasing member being disposed in said interior chamber and fixedly attached at the inner end of the biasing member to a portion of said container housing, said inner end of said leash strap being connected to said outer end of said biasing member, and said leash strap being biased to be in said coiled configuration by said biasing member.

18. The leash of claim 16, wherein the leash container housing includes at least one of a whistle, a glow in the dark, reflective ID tag, an LED light, a GPS locating device, or identifying information on at least one of the first container side wall and second container side wall for reuniting a user with a lost animal connected to the leash.

19. A leash configured to be connected to an article for restraining or controlling an animal or a child, comprising:
a leash container housing including a stationary outer circumferential case portion, a first container side wall and a second container side wall fixedly attached to said stationary outer circumferential case portion and defining an interior chamber therein, and a leash strap opening being defined in said stationary outer circumferential case portion;
a fixed spindle extending between said first container side wall and second container side wall substantially perpendicular to said first container side wall and second container side wall;
an inner rotatable spool portion rotatably mounted between the first container side wall and second container side wall over said fixed spindle;
a leash strap having an inner end and an outer end, said leash strap extending through said leash strap opening in said stationary outer circumferential case portion, said leash strap having a coiled configuration coiled within the container housing and an extended configuration extending from the container housing;
a biasing member having an inner end and an outer end, said biasing member being disposed in said interior chamber and fixedly attached at the inner end of the biasing member to a portion of said container housing, said inner end of said leash strap being connected to said outer end of said biasing member, and said leash strap being biased to be in said coiled configuration by said biasing member;
a connector assembly including a cylindrical stem connected to said outer end of said leash strap, said cylindrical stem including an end portion with an outer surface defining a recess;
a latch pin slidably mounted in the interior chamber adjacent to a first opening through the leash container housing, said latch pin being movable between a latched position and an unlatched position, said recess of said cylindrical stem being configured to receive said latch pin in said latched position when said leash strap is in said coiled configuration; and
a latch control button mounted adjacent to said latch pin and having a first portion extending through a second opening through said leash container housing and a second portion abutting said latch pin, said latch control button being pivotally mounted in the interior chamber and movable between a first latching control position and a second latching control position, said latch control button moving said latch pin to said latched position in said first latching control position, and said latch control button releasing said latch pin to be free to move to said unlatched position in said second latching control position, said latch control button being biased to said first latching control position, and said second portion of said latch control button moving to release said latch pin to be free to move to said unlatched position when said first portion of said latch control button is pressed inwardly within said interior chamber of said container housing.

20. The leash of claim 19, wherein the leash container housing includes at least one of a whistle, a glow in the dark, reflective ID tag, an LED light, a GPS locating device, or identifying information on at least one of the first container side wall and second container side wall for reuniting a user with a lost animal connected to the leash.

* * * * *